(12) United States Patent
Fedorenko (10) Patent No.: US 11,169,065 B2
(45) Date of Patent: Nov. 9, 2021

(54) METHOD, APPARATUS AND SYSTEM FOR ESTIMATING THE MASS OF A STOCKPILE

(71) Applicant: Intertek Group Plc, London (GB)

(72) Inventor: Sergei Fedorenko, London (GB)

(73) Assignee: Intertek Group Plc, London (GB)

( * ) Notice: Subject to any disclaimer, the term of this patent is extended or adjusted under 35 U.S.C. 154(b) by 426 days.

(21) Appl. No.: 16/322,996

(22) PCT Filed: Jul. 7, 2017

(86) PCT No.: PCT/EP2017/067096
§ 371 (c)(1),
(2) Date: Feb. 4, 2019

(87) PCT Pub. No.: WO2018/033299
PCT Pub. Date: Feb. 22, 2018

(65) Prior Publication Data
US 2019/0178769 A1    Jun. 13, 2019

(30) Foreign Application Priority Data

Aug. 19, 2016 (GB) .................................... 1614223

(51) Int. Cl.
*G01N 9/36* (2006.01)
*G06T 7/62* (2017.01)
(Continued)

(52) U.S. Cl.
CPC ............... *G01N 9/36* (2013.01); *G01B 11/24* (2013.01); *G06Q 10/08* (2013.01); *G06Q 50/02* (2013.01);
(Continued)

(58) Field of Classification Search
CPC ......... G01B 11/24; G01F 22/00; G01F 22/02; G01G 9/00; G01N 9/00; G01N 9/36;
(Continued)

(56) References Cited

U.S. PATENT DOCUMENTS

| | | |
|---|---|---|
| 6,028,270 A | 2/2000 | Sjostrom et al. |
| 2004/0031335 A1* | 2/2004 | Fromme ................. G01F 22/00 73/865 |

(Continued)

FOREIGN PATENT DOCUMENTS

| | | |
|---|---|---|
| CN | 104251664 A | 12/2014 |
| CN | 104634427 A | 5/2015 |

(Continued)

OTHER PUBLICATIONS

International Search Report and Written Opinion of corresponding International Application No. PCT/EP2017/067096 dated Nov. 8, 2017.

(Continued)

*Primary Examiner* — John H Le
(74) *Attorney, Agent, or Firm* — Renner, Otto, Boisselle & Sklar, LLP (57) ABSTRACT

The invention resides in a method or system configured to estimate the mass of material in a stockpile. The surface profile of the stockpile is obtained and a plurality of layers are defined in the stockpile. Each layer extends parallel to the surface profile. Density characteristics of the stockpile material are obtained, from database records or measurement tests. The volume of each layer is estimated. The density of each layer is estimated, according to the density characteristics of the stockpile material. Using the volume of each layer and the density of each layer the mass of the stockpile is calculated.

12 Claims, 8 Drawing Sheets

(51) Int. Cl.
*G06Q 10/08* (2012.01)
*G06Q 50/02* (2012.01)
*G01B 11/24* (2006.01)
*G06Q 50/28* (2012.01)
*G06Q 99/00* (2006.01)
*G01G 9/00* (2006.01)
*G01N 9/00* (2006.01)
*G01F 22/00* (2006.01)
*G01F 22/02* (2006.01)

(52) U.S. Cl.
CPC ............... *G06T 7/62* (2017.01); *G01F 22/00* (2013.01); *G01F 22/02* (2013.01); *G01G 9/00* (2013.01); *G01N 9/00* (2013.01); *G06Q 50/28* (2013.01); *G06Q 99/00* (2013.01); *G06T 2207/30108* (2013.01)

(58) Field of Classification Search
CPC ........ G06Q 10/08; G06Q 50/02; G06Q 50/28; G06Q 99/00; G06T 2207/30108; G06T 7/62

USPC ........................................................ 702/137
See application file for complete search history.

(56) References Cited

U.S. PATENT DOCUMENTS

2008/0156124 A1   7/2008   O'Connor et al.
2015/0276468 A1   10/2015  Jaeger

FOREIGN PATENT DOCUMENTS

SU   1520351 A1   11/1989
WO   2015/048123 A1   4/2015

OTHER PUBLICATIONS

Search Report of corresponding Great Britain Application No. 1614223.4 dated Jan. 31, 2017.

\* cited by examiner

| Test configuration | | | | | | | | | | | | |
|---|---|---|---|---|---|---|---|---|---|---|---|---|
| | | | | Unit | | | | | | | | |
| Volume of test cell | | | | 3244 cm³ | | | | | | | | |
| Surface area of test cell | | | | 181 cm² | | | | | | | | |
| Mass of wheat sample | | | | 2407.05 g | | | | | | | | |
| Initial height of sample in cell | | | | 179.23 mm | | | | 742 kg/m³ | | | | |
| Initial Density | | | | 742 kg/m³ | | | | Value of mass provided by "client" | | | | |
| Gravity | | | | 9.806 m/s² | | | | *assuming a rectangular container, with vertical sides and a footprint of 10 m² | | | | |

| A | B | C | D | E | F | G | H | J | K | L | M |
|---|---|---|---|---|---|---|---|---|---|---|---|
| Layer | Depth (m) | Height reduction post-simulation (mm) | Height of sample (mm) | Volume of material in test cell (m³) | Density (kg/m³) | Estimated Force applied to layer below (N) | Calculated Mass - PER LAYER (kg) | Mass (no layering) (kg) | Accumulated total mass - PER LAYER (kg) | Accumulated total mass (no layering) (kg) | % difference |
| Surface | 0 | 0 | 179.23 | 0.003244 | 741.99 | 131.69 | | | | | |
| L1 | 1 | 1.912 | 177.318 | 0.003209 | 749.99 | 264.81 | 7460 | | 7460 | 7420 | -0.54% |
| L2 | 2 | 5.38 | 173.85 | 0.003147 | 764.95 | 400.58 | 7575 | | 15035 | 14840 | -1.31% |
| L3 | 3 | 7.63 | 171.6 | 0.003106 | 774.98 | 538.13 | 7700 | 59360 | 22734 | 22260 | -2.13% |
| L4 | 4 | 8.447 | 170.783 | 0.003091 | 778.69 | 676.34 | 7768 | | 30502 | 29680 | -2.77% |
| L5 | 5 | 8.732 | 170.498 | 0.003086 | 779.99 | 814.77 | 7793 | | 38296 | 37100 | -3.22% |
| L6 | 6 | 10.055 | 169.175 | 0.003062 | 786.09 | 954.30 | 7830 | | 46126 | 44520 | -3.61% |
| L7 | 7 | 10.719 | 168.511 | 0.003050 | 789.18 | 1094.37 | 7876 | | 54003 | 51940 | -3.97% |
| L8 | 8 | 11.209 | 168.021 | 0.003041 | 791.49 | 1234.85 | 7903 | | 61906 | 59360 | -4.29% |
| | | | | | | | 61906 | 59360 | | | |
| | | | | | | | "B" | "A" | | | |
| | Totals | | | | (kg) | %"B" > "A" | | | | | |
| A | Using a single density value | | | | 59360 | - | | | | | |
| B | Calculated on a 'per layer' basis. | | | | 61906 | 4.29% | | | | | |

| P | Q | R | S | T | U | V | W | X | Y | Z |
|---|---|---|---|---|---|---|---|---|---|---|
| Bunker Reference (Source) | STOCK Volume (m^3) | Stated Density (kg/m^3) | Estimated Mass (tonne) | RECORDED Mass (tonne) | LAB Density (kg/m^3) | LAB Mass (tonne) | Estimated - Recorded difference (tonne) | Estimated - Recorded difference (%) | Recorded - LAB mass difference (tonne) | Recorded - LAB mass difference (tonne) |
| 3A | 40,141 | 759.6 | 30,491 | 31,536 | 792.2 | 31,799 | -1,045.22 | -3.43% | -262.53 | -0.83% |
| 5A | 33,115 | 750.7 | 24,859 | 25,817 | 782.9 | 25,926 | -957.67 | -3.85% | -108.55 | -0.42% |
| 4A | 29,777 | 639.5 | 19,043 | 20,079 | 666.9 | 19,859 | -1,036.39 | -5.44% | 219.65 | 1.09% |
| 6B | 23,416 | 752.8 | 17,627 | 18,239 | 785.1 | 18,383 | -611.69 | -3.47% | -144.34 | -0.79% |
| 2B | 17,896 | 766.1 | 13,710 | 14,085 | 800.0 | 14,317 | -374.53 | -2.73% | -232.18 | -1.65% |
| 1A | 13,175 | 667.7 | 8,797 | 9,187 | 696.3 | 9,174 | -390 | -4.43% | 12.75 | 0.14% |
| | 157,519.90 | | 114,527.45 | 118,943.00 | | 119,458.20 | -4,415.55 | -3.86% | -515.20 | -0.43% |

*Bunker 1A mass was verified through calibrated measurement

METHOD, APPARATUS AND SYSTEM FOR ESTIMATING THE MASS OF A STOCKPILE

This application is a national phase of International Application No. PCT/EP2017/067096 filed Jul. 7, 2017 and published in the English language, which claims priority to Great Britain Application No. 1614223.4 filed on Aug. 19, 2016, both of which are hereby incorporated by reference.

The invention relates to a method of estimating the mass of a stockpile. The invention also relates to apparatus, or a system having such apparatus, configured to estimate the mass of a stockpile. In particular, the invention relates to a method, device and system for estimating the mass of stockpiles containing particulate materials.

BACKGROUND OF THE INVENTION

Figure 1:
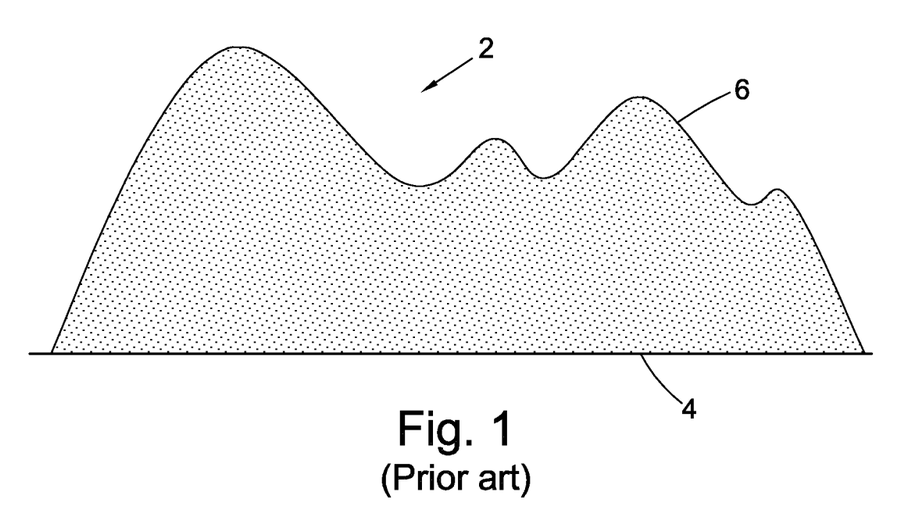

Known methods for estimating the mass of a stockpile utilise can be exemplified by those practiced by SGS Group, a company offering stockpile measuring services (www.SGS.com/mining). By way of example, the density of a stockpile 2 located on a base surface or datum 4, as shown in FIG. 1, is determined by (i) estimating the volume of a stockpile by mapping the surface area 6, (ii) measuring the density and (iii) multiplying these two values to estimate the mass. Mapping the surface area can be achieved, by way of example, with laser scanners or GPS technology and the density can be determined through a combination of drilling and/or weighing a sample of known volume. The ASTM-6347 standard uses a nuclear depth density gauge, which is calibrated to each material being measured. Known methods either use density data derived from a sample, or an average density data derived from a number of measurements obtained through expensive, sophisticated drilling and measurement techniques. Using a nuclear source to determine density has safety implications and is banned in some countries. Certain stockpiles cannot be easily or safely measured through drilling, and drilling requires access to the uppermost points of a stockpile.

SUMMARY OF THE INVENTION

In general terms the invention resides in a method of estimating the mass of material in a stockpile by obtaining a surface profile of said stockpile to estimate the volume, defining layers in the stockpile and estimating the density of each layer while taking in to account the weight of material in the layers above, upon the density of each layer. The layers can be of equal depth.

The surface profile can include the profile of the unseen surface i.e. the surface of the stockpile that rests upon the base or container where the stockpile is stored.

From one aspect, the invention resides in a method of estimating the mass of material in a stockpile, the method including: obtaining a surface profile of said stockpile; defining a plurality of layers in the stockpile, wherein each layer extends parallel to the surface profile and estimating the volume of each layer; obtaining density characteristics of the stockpile material; estimating the density of each layer according to the density characteristics of the stockpile material; and calculating, using the estimated volume and estimated density of each layer, the mass of the stockpile. The layers can have constant depth. The layers can be of equal depth. A layer that is adjacent a base or datum upon which the stockpile rests can have a variation in depth. The term layer encompasses or the term 'band' or 'strata'.

Density characteristics can be obtained from a representative sample of the stockpile material. The characteristics can be stored on a database and retrieved therefrom.

Points at which layers meet, define a boundary of a layer. The boundaries can be vertically displaced from each other (i.e. one above the other). A boundary can define the limit of each layer. Each layer, band or strata can have a constant depth and/or apply an even pressure or force vertically downwards upon material below.

The profile of the base, or ground, or other surface on which the stockpile material can be retained or contained or measured using the same techniques as those adopted to obtain the surface profile.

Each layer extending parallel to the surface profile has an upper limit and a lower limit, said upper limit and/or lower limit configured equidistant, in a vertical direction, from the surface profile. The edge of a layer between the upper and lower limit (or the lower limit of the lowermost layer), can be defined by the ground or base upon which the stockpile rests. The base can be uneven. The gradient of density change of a layer for estimation, in a vertical direction, can be substantially linear. This is typically the case when thin layers or less than 1 m or less than 0.5 m are used. This is because with many thin layers used in the analysis the change in density across a relatively thin layer does not change.

The gradient of density change of a layer, in a vertical direction, can be non-linear. This is the case if, perhaps, a layer is thicker and greater than 1 m in depth.

At least three layers can be defined in the stockpile. The vertical depth can be between 10 mm and 2 m.

Obtaining density characteristics of the stockpile material can include retrieving a representative sample from the stockpile and measuring the density of the representative sample under simulated loads. Obtaining density characteristics of the stockpile material can include retrieving a representative sample from each load of material delivered to the stockpile, measuring the density of each representative sample under simulated loads and using statistical analysis of the characteristics of each representative sample to estimate the density characteristics of the stockpile. At least one of mean, median of characteristics of representative samples can be used to take in to account variations in the material. There are many known techniques for obtaining and preparing a representative sample.

Additionally or alternatively density characteristics can be obtained from a database.

Obtaining density characteristics can include using a compaction test. Density characteristics can be obtained by extrapolating values obtained from tests and/or databases. A database can hold density characteristics for a plurality of different materials and the change in density under different pressures or loads.

The impact of mass upon the density of material in lower layers has been suggested in a linear fashion with layers of the same depth using information from tests performed on representative samples. In light of the teaching herein it can be appreciated that layers of different depths can be used depending on the accuracy required and/or the type of material.

Estimating the density of a layer can include estimating the mass of the layer or layers above, and estimating the density of said layer based on the estimated mass bearing upon said layer.

According to another aspect, the invention resides in a system for estimating the mass of material in a stockpile, the system including: apparatus operable to obtaining a surface profile of said stockpile; and a controller, configured to define a plurality of layers in the stockpile, wherein each layer extends parallel to the surface profile; obtain density characteristics of the stockpile material; estimate the volume of each layer, and the density of each layer, according to the density characteristics of the stockpile material; and estimate, using the estimated volume and estimated density of each layer, the mass of the stockpile.

The system can receive a surface profile and map a boundary between layers within the stockpile. The boundaries can be vertically displaced from each other (i.e. one above the other). A boundary defines the limit of each layer. Each layer, band or strata has constant depth and applies an even pressure or force vertically downwards upon material below.

According to another aspect, the invention resides in computer readable medium storing one or more programs, said programs having instructions, which when executed by an electronic device or system, perform a method disclosed herein.

The invention can be applied to any particulate material that will increase in density when compressed or subjected to a force, which can be due to the weight of the material itself within a stockpile. The invention can be particularly suited to minerals, or other such inorganic materials forming a stockpile. Such minerals or inorganic materials can have an even density distribution in normal or uncompressed conditions.

In light of the teaching of the present invention, the skilled person would appreciate that aspects of the invention were interchangeable and transferable between the aspects described herein, and can be combined to provide improved aspects of the invention. Further aspects of the invention will be appreciated from the following description.

BRIEF DESCRIPTION OF THE FIGURES

FIG. 1 has already been described and in order that the invention can be more readily understood, reference will now be made, by way of example, to the remaining Figures, in which:

FIG. 5a is a table of data showing the force upon a layer influences the density, while FIG. 5b charts data from FIG. 5a;

FIG. 6a is a table of data showing the recorded mass of a number of stockpiles against estimated (and actual) mass values, while FIG. 6b charts data from FIG. 6a.

DETAILED DESCRIPTION

It is well known that determining the mass of a stockpile involves a simple formula, namely mass=volume×density. Stockpiles can have significant commercial value and accurate estimates are important.

Volumes

Figure 2A:
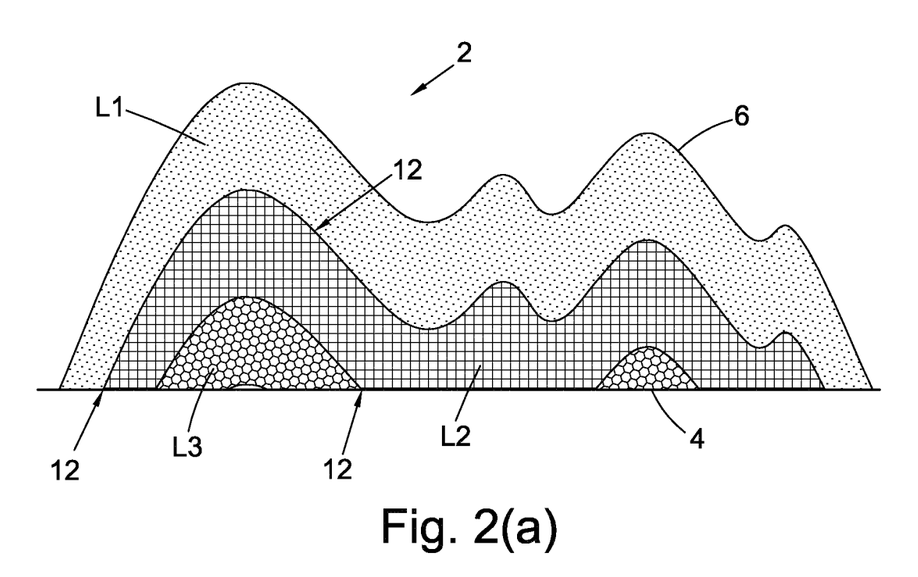
FIGS. 2a to 2d are cross-sectional profiles of stockpiles resting on a base, said stockpiles having layers of equal depth.
Figure 2B:
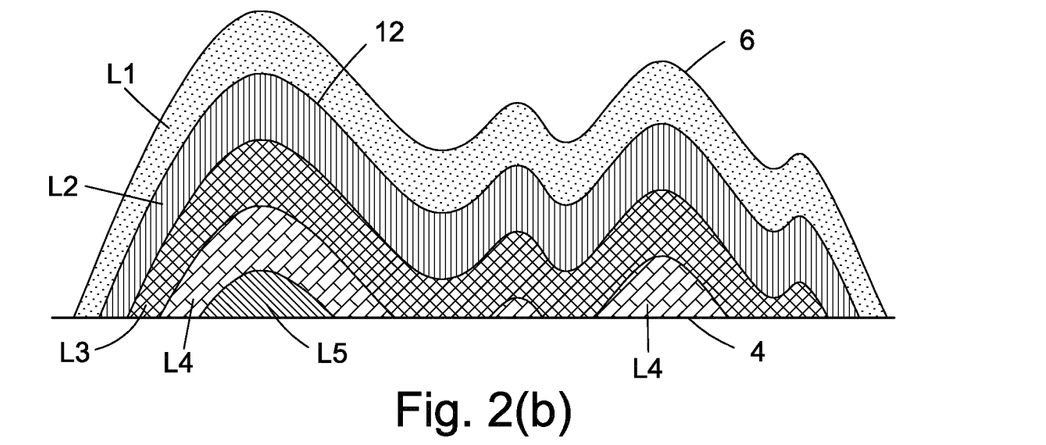
Figure 2C:
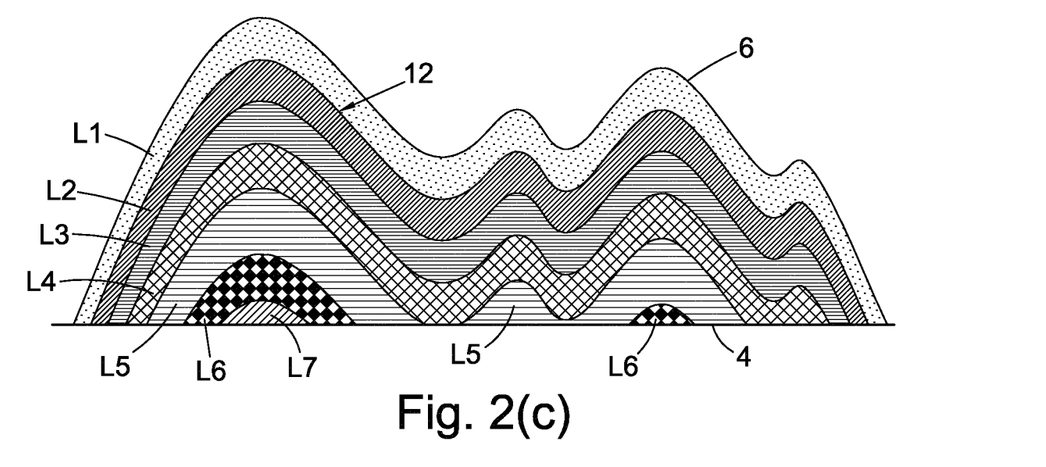
Figure 2D:
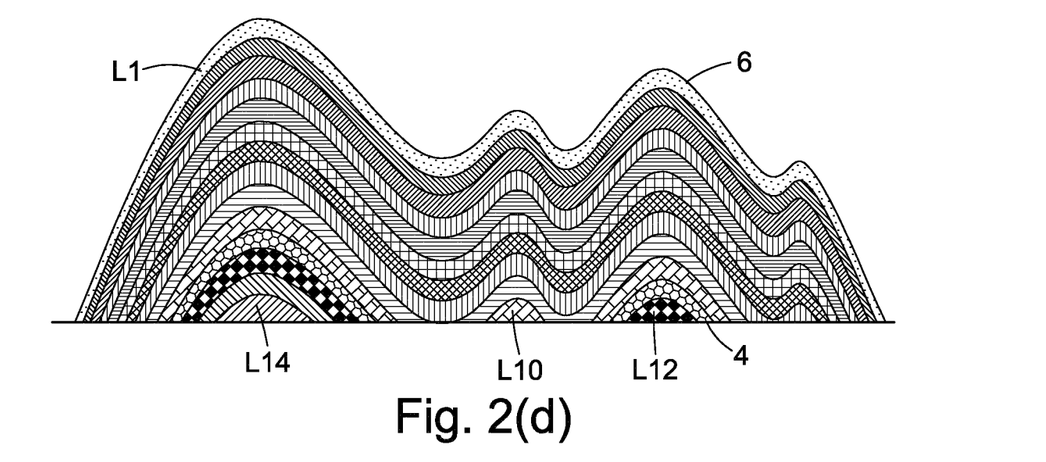
Figure 3:
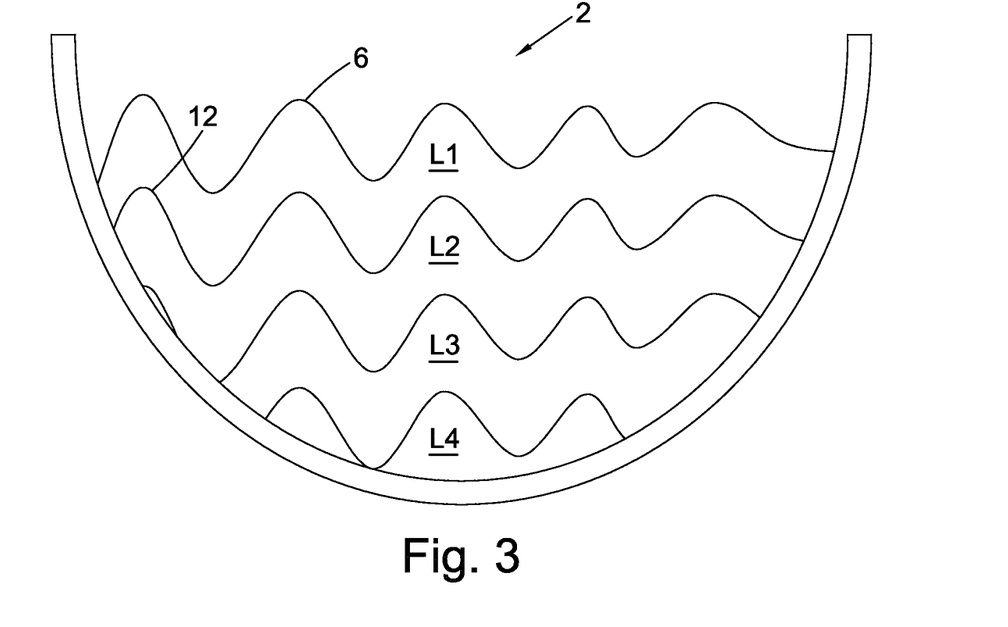
FIG. 3 is a cross-sectional profile of a stockpile within a curved base, indicative of a ship's hold.
Figure 4:
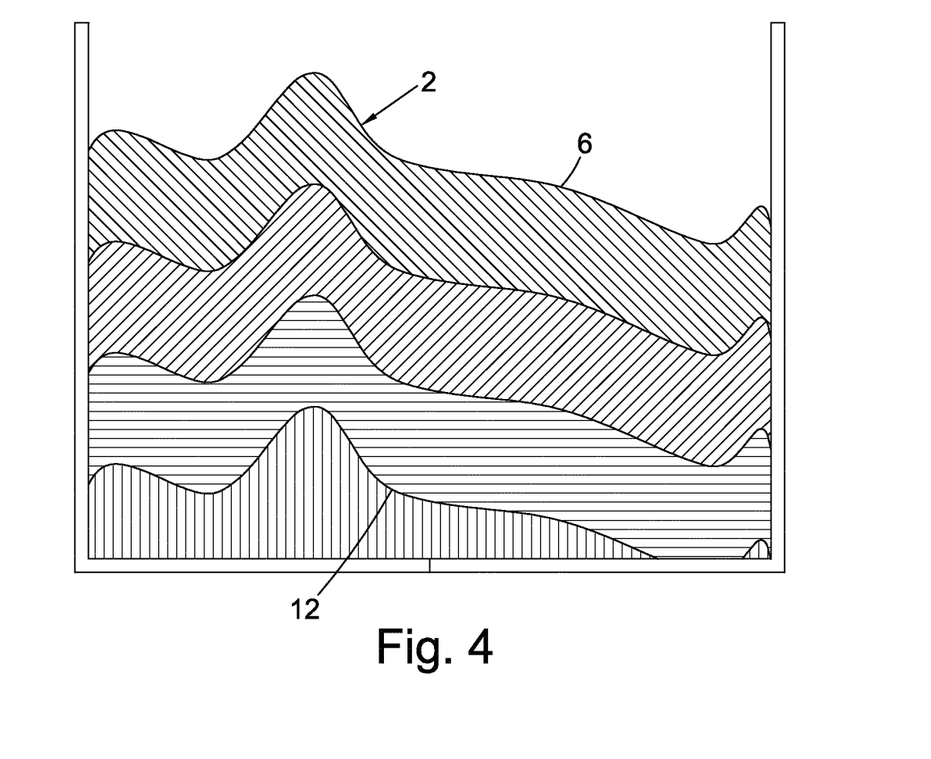
FIG. 4 is a cross-sectional profile of a stockpile within a walled container, such as a warehouse or bunker.

FIGS. 2 to 4 represent individual stockpiles 2 residing on a base 4 and having a surface 6. Both the surface 6 and the base 4 can be measured using known scanning techniques, which are appropriate for the stockpile being assessed. By way of example, the survey techniques include obtaining data acquisition at ground level or by photogrammetry. This is normally conducted to satisfy the requirements of a TIN (Triangular Irregular Network) creating software package. The prismoidal method uses a data point file to create a TIN of the stockpile to determine the volume. The volume of material within the TIN is then computed by electronically filling the volume of the TIN above the datum with prisms or polyhedrons of known volume. The software then totals the number of polyhedrons required to fill the volume of the TIN.

After the surface 6 is mapped, and a surface profile of the stockpile obtained, layers 10 are defined in the stockpile. A plurality of layers are defined, L1 being the uppermost or top layer and the layer numbering increasing, according to depth, until layer Ln, which is the deepest layer. FIGS. 2a to 2d show stockpiles having three, five, seven and 14 layers, respectively.

It will be appreciated that the stockpiles shown in the Figures are cross-sections of three-dimensional stockpiles and that each layer extends parallel to the surface profile in three-dimensions. The layers have a constant depth, and are described herein, by way of example, as having the same depth.

By way of example, a cross-section of stockpile 2 in FIG. 2a is almost 3 m in height at its maximum point. Three layers are defined—L1, L2 and L3. The thickness of each layer is set to be 1 m. Layer L1 is 1 m deep and the boundary 12 between layer L1 and the layer immediately beneath L2 extends in a direction substantially parallel to the surface 2. In other words, the boundary 12 between layer L1 and layer L2 has a profile substantially identical to the profile of the surface 2. The boundary is vertically displaced from, and vertically aligned with, the surface. Therefore, the layer L2 is truncated, in part, by the base or datum 4 on which it rests, thus defining an edge of the layer. Remaining with FIG. 2a, the boundary 12 between layer L2 and layer L3 also has a profile substantially identical to the profile of the surface 2. Because this boundary 12 is also vertically displaced from (and also vertically aligned with) the surface then the layer L3 is truncated, in part, by the base or datum 4 on which it rests, such that its height cannot be 1 m. The height of the lowermost layer can be established from the datum 4.

A layer L can be truncated such that it is divided in to two or more parts. This occurs when the surface 2, and the boundaries 12 beneath, undulate in height. If the depth of a layer is less than the difference in height between a peak and trough on the surface then the probability of a layer L being split in to a plurality of parts increases. Layer L3 of FIG. 2a is truncated in to two parts. In FIG. 2b, Layer L4 is truncated in to 3 parts. Layer L5 and layer L6 of FIG. 2c are truncated in to three and two parts, respectively. FIG. 2d has many layers L truncated or divided in to parts.

For estimations, however, the volume of each layer L, or parts of a layer L, are estimated from the surface 2 data and the base 4 data. For each layer, or part thereof, its depth with respect the surface 2 can be calculated. In this way, the pressure or forces upon a layer can be taken in to account.

The boundary 12 between each layer L, where no truncation occurs, mirrors the surface 2 profile. In the Figures and the examples provided, the depth of each layer is the same unless it is truncated by the datum 4. The depth of each layer is nominally 1 m, but can be up to 2 m. Reducing the layer depth increases the number of layers and increases the accuracy of the mass estimation, although the number of calculations required also increases. The layers can have different depths. The depth of the layers can decrease in a vertical direction. In this way, a more accurate estimate of the mass can be made by increasing the accuracy of mass estimation for layers that are subject to greater pressure or forces, such as those closest to the base 4. The thickness of each layer and/or whether the layers have the same depth can be set according to the material in the stockpile. This is because different materials' density varies differently under pressure and/or other environmental conditions.

The volume of each layer is calculated. The sum of the volume of each layer can be checked against the total volume of the stockpile.

Density

To estimate the mass of a stockpile density characteristics of the stockpile material are obtained. The characteristics can be obtained from a database if the material in the stockpile is known and a dataset of the characteristics corresponding to said material can be used in estimations of the mass.

Additionally or alternatively, a "representative sample" of the material can be taken from the stockpile. The characteristics of the material include the density of the material. Characteristics can include a chart or table indicating the change in density under different loads or pressures.

A single sample can be taken from a stockpile and the characteristics of said sample used to estimate the mass of the stockpile. Additionally or alternatively, representative samples can be taken from each batch of material delivered to the stockpile. The characteristics of each batch can be taken into account to determine, statistically, characteristics that are representative of the stockpile. By way of example, the average of the density characteristics of each batch can be used.

Density—Example

Characteristics can be derived from testing a representative sample of material. By way of example, a representative sample of a wheat stockpile was assessed to determine its characteristics. The invention, however, is not limited to wheat and can be applied to any particulate material that will increase in density when compressed. The test described herein can, therefore, be adapted for different materials.

Figure 5A:
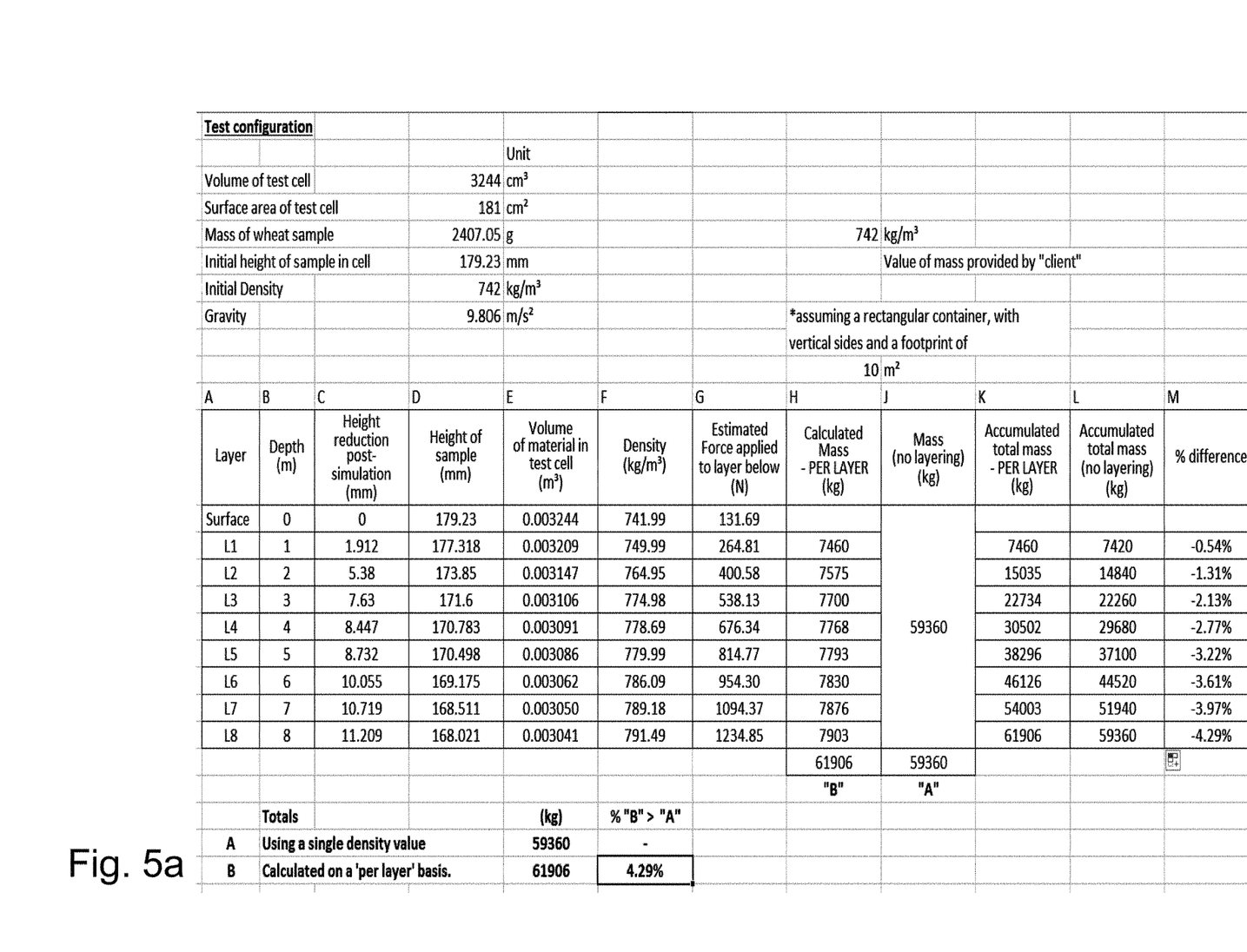

A representative sample of material was taken and placed in a cylindrical test cell having calibrated dimensions. Details are shown in the table of FIG. 5a. The volume of the cylindrical test cell was 3244 cm$^3$ and the surface area of the internal footprint was 181 cm$^2$. The mass of the wheat sample was 2707.05 g. The initial height of the sample in the cell was 179.23 mm (column D). The initial density was measured as 741.99 kg/m$^3$ (column F). For the purpose of this example, the stockpile had a height of around 8 m. The source of the sample can often influence the estimated mass of the stockpile because variations in the material can occur. The example herein uses a 'representative sample'.

Layer L1

The representative sample is considered indicative a sample taken from the stockpile to be evaluated, which can be used to estimate the mass of the whole stockpile. A portion from said representative sample was placed in a test cell. At a depth of "0 m" (no compression) the density was measured using the dimensions of the cell and the weight of the sample. The density was 741.99 kg/m$^3$. Assuming that each layer's depth was 1 m, the force applied by layer L1 to the layers beneath was estimated to be 131.69N (column G).

In light of the invention, there are many ways in which the change in density of the material in a stockpile can be taken in to account when calculating the mass of each layer. The simplest way is to assume that the density at the surface is constant across the layer i.e. the density at the boundary 12 between layer L1 and L2 is the same at the surface i.e. 741.99 kg/m$^3$ at the bottom of layer L1. The inventor, however, prefers to calculate the mass using an average density value that takes in to account the estimated density at the surface and the simulated density at each layer boundary.

The force applied by layer L1 upon layer L2 was simulated by a computerised electronic universal testing machine having a 5 kN capacity servo controlled motor. The machine applied, via a platen, a force of 131.69N to the surface area of the wheat within the test cell thus simulating the weight of the material above. This can be performed for a period of time to allow the material to stabilise. In this case the pressure was applied for approximately 10 minutes and the resulting reduction in height, due to the compression, was recorded (columns C and D).

The density at the bottom of layer L1 was calculated i.e. using the known mass of the representative wheat sample and the volume occupied by said sample under pressure within the test cell. The density at a depth of 1 m, at the boundary between L1 and L2 is 749.99 kg/m$^3$.

The calculated mass of layer L1 is not calculated based on the surface density of the stockpile, and the mass of layer L1 is calculated when the impact of the mass of layer L1 upon layer L2 is known. Therefore, the calculation of the mass of layer L1 uses the volume of the layer multiplied by the average density between the boundaries of the layer. For layer L1 that is the surface density and the density at a depth of 1 m i.e. an average of the sum of 741.99 kg/m$^3$ and 749.99 kg/m$^3$. The calculated mass of material in a rectangular container with vertical sides and a footprint of 10 m$^2$ is 7460 kg.

Layer L2

At a depth of "1 m", under the compression of layer L1, the density is 749.99 kg/m$^3$. Assuming again that each layer's depth was 1 m, the force applied by layer L2 to the layers beneath was estimated to be 264.81N (column G). The force applied by layer L2 upon layer L3 was simulated, as per the method of layer L1 and the resulting reduction in height, due to the compression, was recorded (columns C and D). The density at the bottom of layer L2, at a depth of 2 m, at the boundary between L2 and L3 is 764.95 kg/m$^3$.

The calculated mass of layer L2 is calculated based on the impact of the mass of layer L2 upon layer L3. Therefore, the calculation of the mass of layer L2 uses the volume of the layer multiplied by the average density between the boundaries of the layer. For layer L2 that is the average of (i) the density at the boundary between L1 and L2 at a depth of 1 m, and (ii) the density at the boundary between L2 and L3 at a depth of 2 m i.e. an average of the sum of 749.99 kg/m$^3$+764.95 kg/m$^3$. The calculated mass of material in a rectangular container with vertical sides and a footprint of 10 m$^2$ is 7575 kg.

Layer L3

At a depth of "3 m", under the compression of layer L1 and L2, the density is 764.95 kg/m$^3$. Assuming again that each layer's depth was 1 m, the force applied by layer L3 to the layers beneath was estimated to be 400.58N (column G). The force applied by layer L3 upon layer L4 was simulated, as per the method of layer L1 and the resulting reduction in height, due to the compression, was recorded (columns C and D). The density at the bottom of layer L3, at a depth of 3 m, at the boundary between L3 and L4 is 774.98 kg/m$^3$.

The calculated mass of layer L3 is calculated based on the impact of the mass of layer L3 upon layer L4. Therefore, the calculation of the mass of layer L3 uses the volume of the layer multiplied by the average density between the boundaries of the layer. For layer L3 that is the average of (i) the density at the boundary between L2 and L3 at a depth of 2 m, and (ii) the density at the boundary between L3 and L4 at a depth of 3 m i.e. an average of the sum of 764.95 kg/m$^3$+774.98 kg/m$^3$. The calculated mass of material in a rectangular container with vertical sides and a footprint of 10 m$^2$ is 7700 kg.

Layer Ln

The sequential calculation and simulated force upon the wheat sample was repeated, as shown and tabulated in FIG. 5a. The purpose of the simulated force upon the representative sample is to enable the density of each layer to be estimated.

In light of the teaching herein, the test cell and associated equipment can be adapted in size to accommodate materials with larger particle sizes. Adaptations can also be made to enable estimations with shallower layers to be made possible. The inventor considers that the optimum range of layer depths is between 0.2 m and 1.5 m, but a range of up to 2 m can be implemented.

Mass Per Layer

From the estimated mass, simulated forces and change in height of material in the test cell the density of each 1 m layer was estimated, in turn. Using the estimated density for each layer, and an assumed volume, such as a rectangular container with vertical sides and a footprint of 10 m$^2$, the mass can be calculated for a given layer L.

A typical scenario, where a stockpile owner asks for an audit of its mass results in an estimated volume (Column J) is based on a single density value (referred to as the "bulk density") provided by the owner. Without the layering of the invention, the mass in this example is calculated to be 59360 kg, using known techniques.

On the other hand, if mass is calculated per layer, as per the invention, using the characteristics of the material to determine the density of each layer, then the estimated total mass is higher (column H) at 61906 kg. This is because the density has been shown to increase across layers by using a single representative sample, for example. By using the average density the variation between the density of each layer is averaged out. Other methods of distributing the density to improve accuracy can also be used.

Improving the accuracy of the measurement by amortising the density can be further mitigated by reducing the thickness of the layers used in the measurements and subsequent calculations.

Figure 5B:
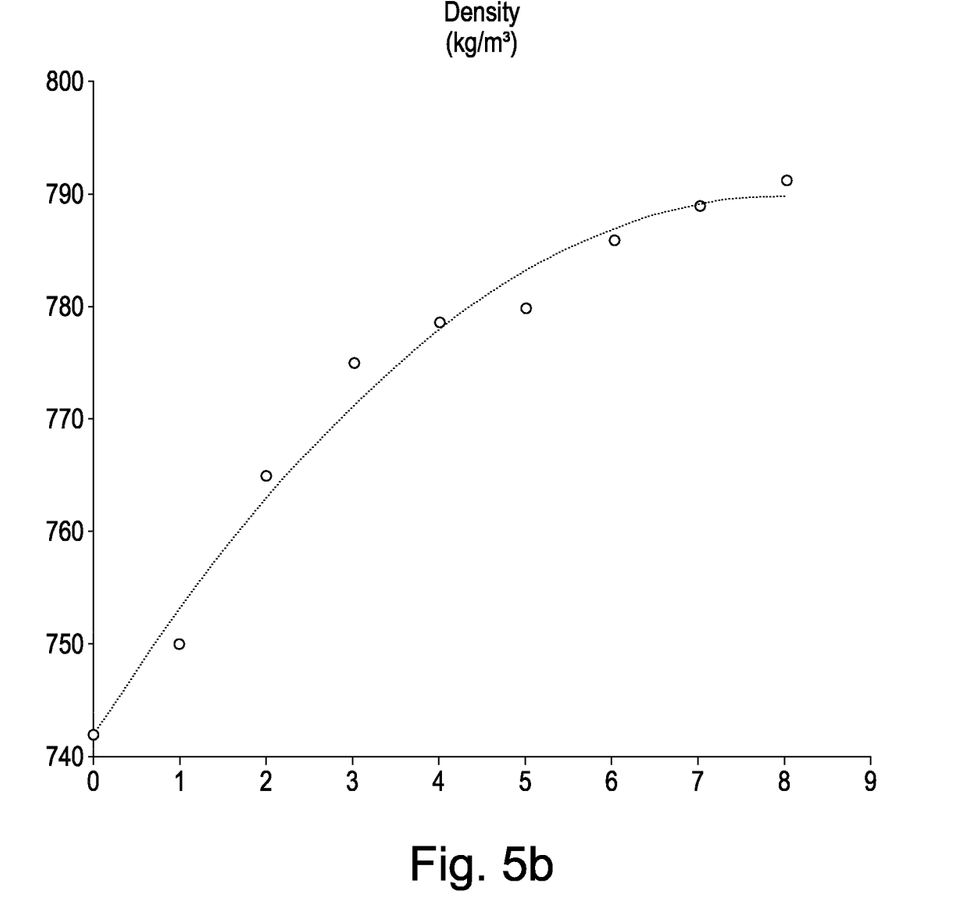

Although not described in depth herein, the density of a layer can be estimated using a simulated depth of 1 m, for example. Using the data obtained from the laboratory experiments the density profile can be graphically represented—as per FIG. 5b. From a best-fit curve (e.g. a polynomial curve) the density of the stockpile can be estimated at intermediate points between the boundaries of each layer such that the method as claimed can simulate a greater number of layers than was actually measured. To be clear, while the Table and Graph of FIGS. 5a and 5b respectively show densities in a stockpile having 1 m layers, the best-fit curve from the graph can be used to refine the estimations by, for example, estimating the density of 0.5 m deep layers.

In the example of FIG. 5a the total calculated mass is 61906 kg, which is 4.29% higher that the mass of 59360 that would have been calculated if the "bulk density" had been used. It can be seen from columns K, L and M that the difference between the known technique (no layering) and method of the invention (measurements per layer) increase as the depth of the stockpile increases.

In light of the teaching herein the depth of the layers can be increased or decreased by estimating the density from a previously recorded measurements, such as that shown in FIG. 5a. Estimates of the density for deeper or shallower layers can be determined form a "best fit" curve, such as a polynomial curve, through the density measurements.

In practice, a material such as wheat is stored in a bunker and is delivered in truck-loads. Representative samples can be taken from each delivery load to determine density measurements for each load and estimate, statistically, the variation in density at various depths in the bunker.

Total Mass

Figure 6A:
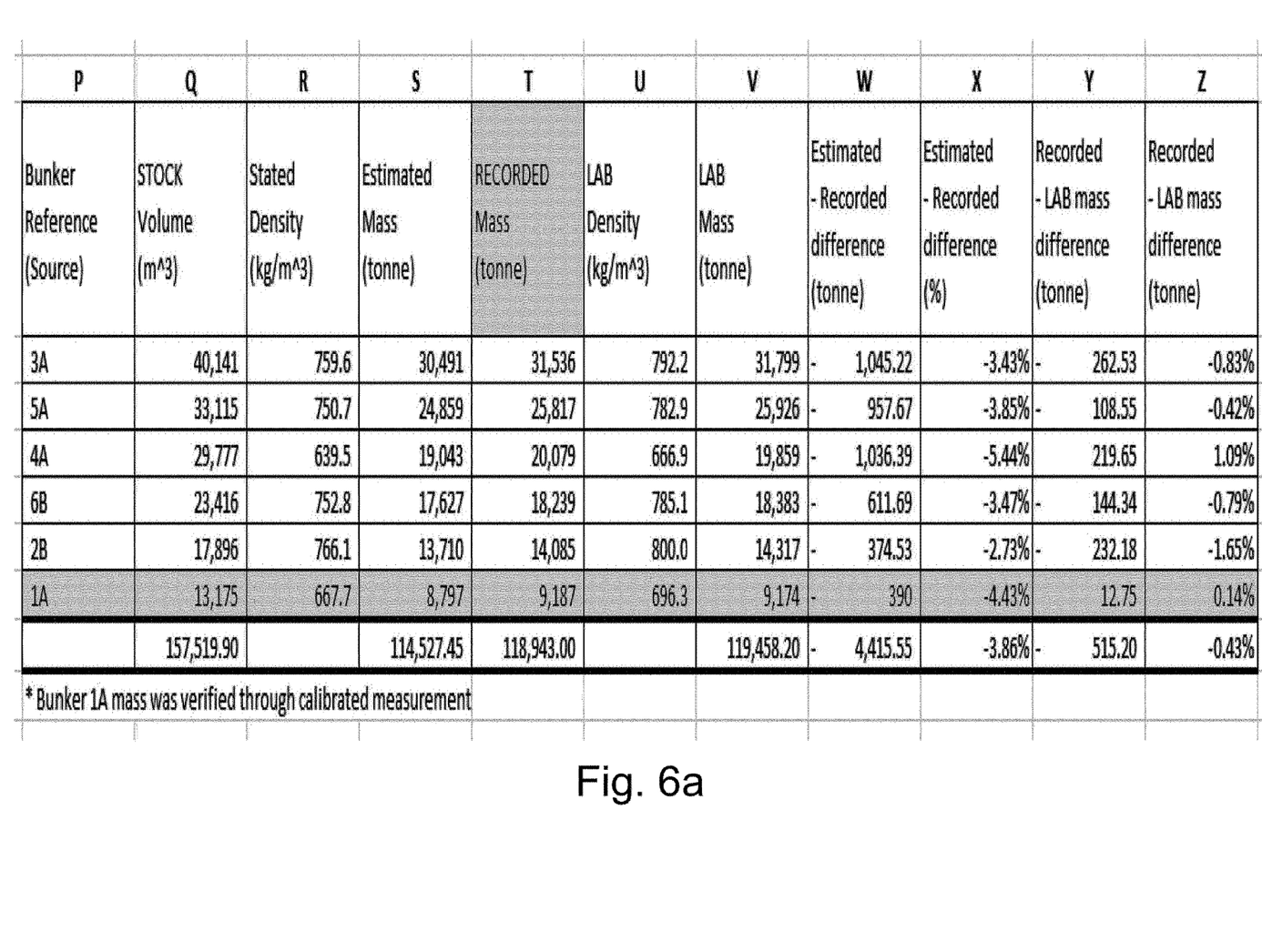
Figure 6B:
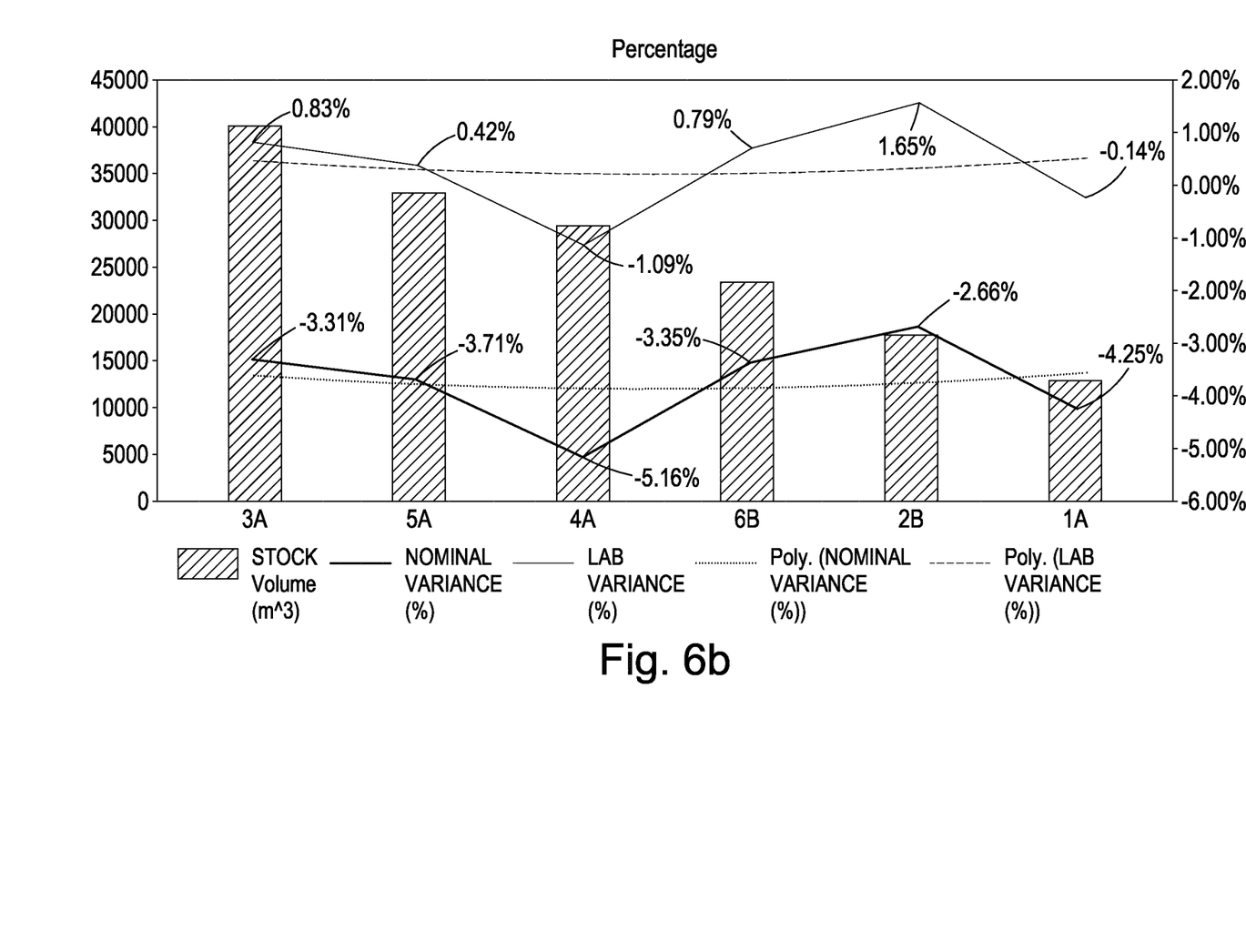

FIG. 6a tabulates a real-world scenario in which the mass of material in a number of bunkers (column P) was to be audited for a client. The stock volume (column Q) and a density, referred to as the "bulk density" (column R) were provided by the client for each bunker and used to estimate the mass (column S) using known techniques.

The mass of each delivery of material to each bunker, as well as the mass of material removed, was monitored over time to provide the recorded mass (column U). In theory, this "book value" should have been an accurate representation of the true mass of the material in each bunker. The difference between calculated mass and recorded mass was high (columns W and X).

It is important to note that the recorded mass (column U) is not necessarily accurate, but considered to be, prior to an audit, the most accurate indication of the mass of material in the bunker. To determine the accuracy of the method herein, the material of Bunker 1A was accurately measured through systematic removal of material on to a truck that was weighed using a calibrated weighbridge. Bunker 1A provides an accurate reference to enable the accuracy of the invention to be determined.

Using Bunker 1A as an example, the density of material was simulated across different layers using the compression test described above. Using the method described above, in which the density of layers was simulated, the average of the densities across the layers for Bunker 1A was 696.3 kg/m$^3$ (column U—LABoratory density)—and was used to estimate the mass (column V—LABoratory mass) as 9174 tonnes. The difference between the calibrated mass measurement of 9187 tonnes and the LAB estimate of was 13 tonnes, or 0.14% difference. Although the mass of material in Bunkers 3A, 5A, 4A, 6B and 2B was not verified by a calibrated weigh-bridge, the "Laboratory" or "LAB" method disclosed herein was used to estimate the mass of each Bunker. Assuming that the recorded mass (column T) is correct, then the average error using known estimation techniques was −3.86%, while the method of the invention had an average error of −0.43%.

Figure 7:
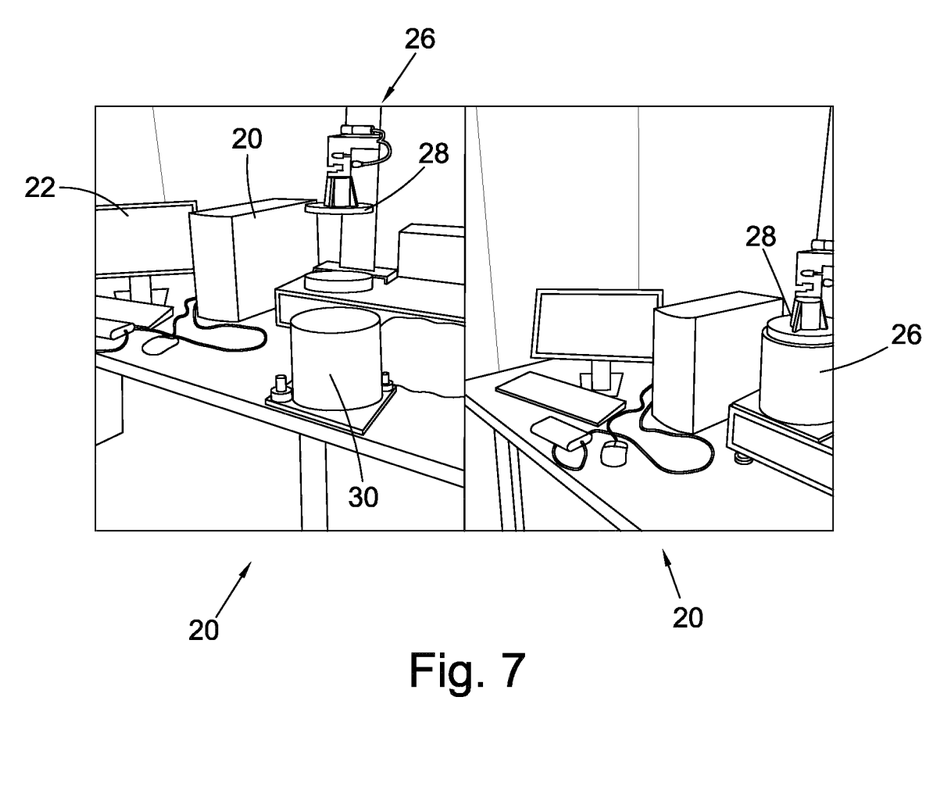
FIG. 7 shows a representative sample together with the measurement apparatus.

FIG. 7 shows a system 20 having a control unit 22 and an interface 24 arranged to control a device 26 configured to apply pressure via a platen 28 to a representative sample of material located in a test cylinder 30. Via the interface the system can be controlled to establish the data and graphs of FIGS. 5a and 5b. The system can be adapted to measure other materials and/or other simulated layer depth pressures.

The present invention has been described above purely by way of example, and modifications can be made within the spirit and scope of the invention, which extends to equivalents of the features described and combinations of one or more features described herein. The invention also consists in any individual features described or implicit herein.

The invention claimed is:

1. A method of estimating the mass of material in a stockpile, the method including:

obtaining an upper surface profile of said stockpile by photogrammetry;

defining a plurality of layers in the stockpile based on the upper surface profile, wherein each layer is defined to extends parallel to the upper surface profile, and estimating the volume of each defined layer;

obtaining density characteristics of the stockpile material;

estimating the density of each defined layer according to the density characteristics of the stockpile material; and calculating, using the estimated volume and estimated density of each defined layer, the mass of the stockpile.

2. The method of claim 1, wherein each layer extends parallel to the upper surface profile and has a boundary, configured equidistant, in a vertical direction, from the upper surface profile.

3. The method of claim 1, wherein each layer has a constant depth and/or applies an even pressure or force vertically downwards upon material below.

4. The method of claim 1, wherein a gradient of density change of a layer, in a vertical direction, is substantially linear.

5. The method of claim 1, wherein a gradient of density change of a layer, in a vertical direction, is non-linear.

6. The method of claim 1, wherein at least three layers are defined in the stockpile.

7. The method of claim 1, wherein a vertical depth of each layer is between 10 mm and 2000 mm.

8. The method of claim 1, wherein obtaining density characteristics of the stockpile material includes retrieving a representative sample from the stockpile and measuring the density of the representative sample under simulated loads.

9. The method of claim 8, wherein obtaining density characteristics includes using a compaction test and/or obtaining density characteristics from a database.

10. The method of claim 1, wherein obtaining density characteristics of the stockpile material includes retrieving a sample from each load of material delivered to the stockpile, measuring the density of each representative sample under simulated loads and using statistical analysis of the characteristics of each representative sample to estimate the density characteristics of the stockpile.

11. A computer readable storage medium storing one or more programs, said programs having instructions, which when executed by an electronic device or system, perform a method according to claim 1.

12. A system for estimating the mass of material in a stockpile, the system including:

apparatus operable to obtaining an upper surface profile of said stockpile; and a controller, configured to define a plurality of layers in the stockpile based on the upper surface profile, wherein each layer is defined to extends parallel to the upper surface profile, and estimate the volume of each layer; obtain density characteristics of the stockpile material;

estimate the density of each defined layer, according to the density characteristics of the stockpile material; and calculate, using the estimated volume and density of each defined layer, the mass of the stockpile.

* * * * *